Jan. 16, 1945.                C. R. FORDYCE ET AL                    2,367,493
                        CELLULOSE DERIVATIVE EXTRUSION PROCESS
                              Filed Dec. 19, 1940
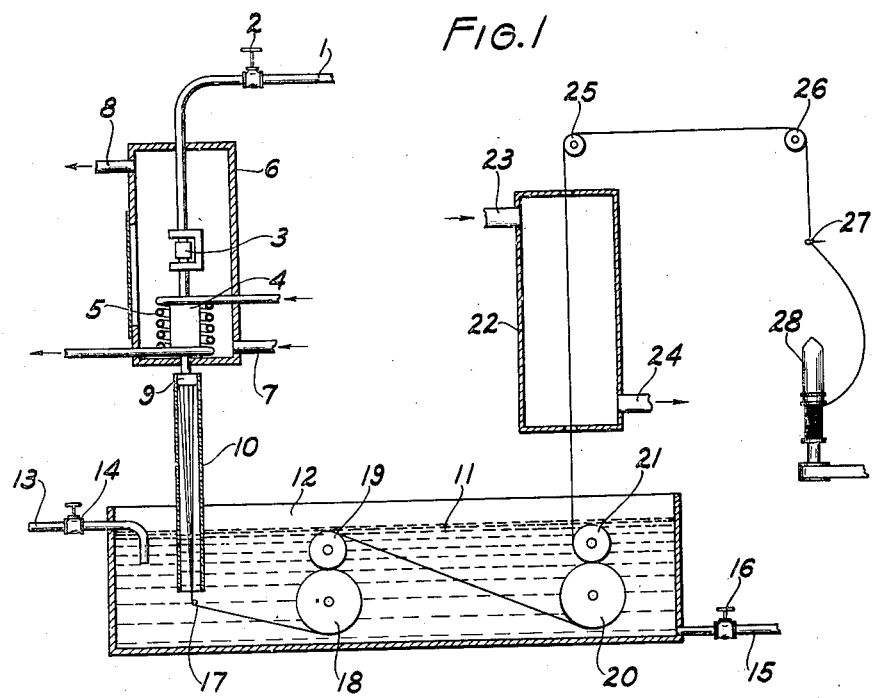
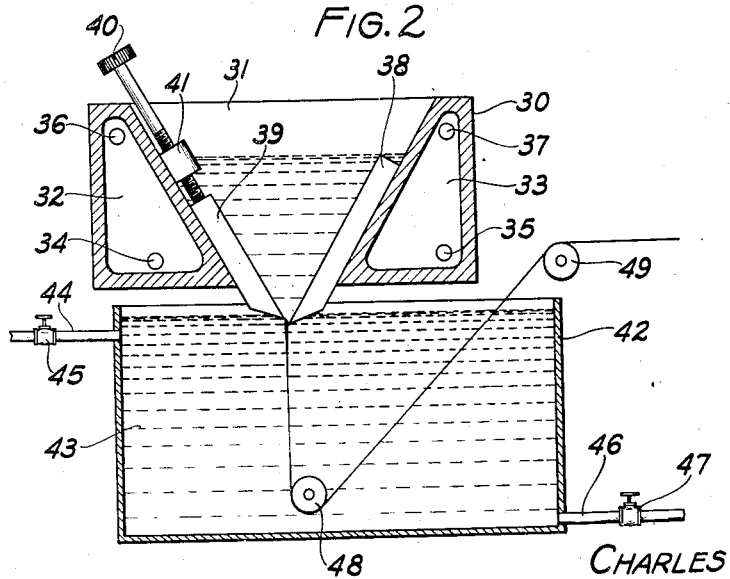
CHARLES R. FORDYCE
GERARD J. CLARKE
INVENTORS Patented Jan. 16, 1945

2,367,493

UNITED STATES PATENT OFFICE 2,367,493

CELLULOSE DERIVATIVE EXTRUSION PROCESS

Charles R. Fordyce and Gerard J. Clarke, Rochester, N. Y., assignors to Eastman Kodak Company, Rochester, N. Y., a corporation of New Jersey Application December 19, 1940, Serial No. 370,852

1 Claim. (Cl. 18—54)

This invention relates to the extrusion of cellulose derivative compositions in the form of filaments, threads, sheets, bands, and the like, as well as the injection molding of such compositions, and more particularly to the extrusion of certain alkylene chloride dopes of cellulose esters which are capable of being dissolved at a given temperature to form a dope which is susceptible of solidification by gelation at a lower temperature.

Many different types of processes for the extrusion and molding of cellulose derivative compositions are known. These processes include the extrusion of solutions and other types of cellulose derivative compositions through fine orifices to produce filaments, the extrusion of doughy plastic compositions through other types of devices provided with extrusion nozzles to produce sheets, tubes, cylinders, and many other objects. Extrusion of cellulose derivative compositions into closed molds as well as the formation from such materials of many different objects by open molding are well known.

In the course of extensive research in the field of cellulose derivatives, it has been discovered that various cellulose esters can be dissolved in certain specific solvent combinations at a given temperature to form solutions which are susceptible of solidification by gelation to form clear, transparent, self-supporting gels having, due to their peculiar internal structure, sufficient strength and rigidity to render them capable of stripping from film-forming surfaces and of being otherwise mechanically treated and handled while still containing very large amounts of solvent. The general nature, composition, and properties of these so-called gel type dopes are described in U. S. patents, Nos. 2,319,051, 2,319,052, 2,319,053, 2,319,054 and 2,319,055. Continuing research on the commercial applications of these gel dopes, we have discovered that they may be employed, under conditions which will be more fully set forth hereinafter, in a number of extrusion and other processes to produce attenuated products such as sheets, rods, tubes, filaments and various other products. While numerous cellulose derivative compositions have been employed in such processes, so far as we are aware, true gel type dopes have heretofore never been employed for such purposes.

Our invention has as an object to provide an improved extrusion process for the manufacture of attenuated products such as sheets, rods, tubes, filaments and the like. A further and more specific object is to provide a process of producing yarns and filaments of truly circular cross-section which have aproximately two or more times the tensile strength of yarns prouded by customary practice employing known spinning solutions. A still further object is to provide an improved process for the injection molding of various types of articles and for the coating of metal blanks and the like in the manufacture of cellulose derivative-coated articles. Other objects will appear hereinafter.

These objects are accomplished by the following invention, which, in its broader aspects, comprises the extrusion of a stream of dope of the gelation type referred to above through a suitably shaped orifice, solidifying the dope by cooling to within its gelation temperature range and thereafter removing residual solvent from the gelled product. In one form of our invention, the extruded material may be cooled to the gelation temperature of the solution in question by conducting it through a body of a liquid which is a non-solvent for the cellulose ester material maintained at a temperature at or below the gelation temperature of the solution. Preferably, the non-solvent liquid should be a good solvent for the solvents contained in the dope, and will leach or extract the solvent from the gelled material and thereby facilitate curing.

In another form of our invention, the gel dope heated to a temperature above its gelation temperature is extruded directly into a body of the cold non-solvent liquid through which it may be conducted for any desired diistance and subjected to stretching or other treatment if necessary.

In the following examples and description, we have set forth several of the preferred embodiments of our invention, but they are included merely for purposes of illustration and not as a limitation thereof.

Our invention can probably best be explained by reference to two specific applications thereof, namely, the production of filaments and the production of sheets or films, although many other practical applications of the invention are possible, such as the formation of ribbons, tubes, rods, and other attenuated products, as well as the production of many useful and ornamental articles produced by the extrusion molding of appropriate solutions.

In the accompanying drawing:

Fig. 1 is a diagrammatic elevational sectional view of one type of apparatus suitable for the manufacture of filaments in accordance with our invention.

Fig. 2 is a diagrammatic elevational sectional view of one type of apparatus suitable for the formation of sheets or films in a modified form of our process.

Filament manufacture

One form of apparatus which may be employed for the production of filaments in accordance with our invention is that shown in Fig. 1. In this figure the numeral 1 designates a conduit for supplying a suitable gel type dope to the spinning apparatus, flow of dope through the conduit being controlled by valve 2. Since in many cases it may be desirable to maintain the dope at temperautres above room temperatures, conduit 1 may be suitably lagged to prevent heat losses, as is well known in the art.

The numeral 33 designates a metering pump for controlling the flow of dope to candle filter 4 which is heated by means of a hot fluid caused to circulate through heating coils 5.

The pump and candle filter assembly is enclosed in a cabinet 6 which is provided for the purpose of keeping the assembly heated to a temperature above the gelation temperature of the dope in question. Heat may be supplied to this cabinet by means of a current of heated air or other fluid supplied through inlet conduit 7, egress of the air being by means of outlet conduit 8.

Numeral 9 designates the spinnerette through which the dope is extruded in the form of filaments. Connected to the spinnerette is a tube 10, preferably of glass and provided, if necessary, with cooling means (not shown), which provides a quiet zone or dead air space into which the filaments are initially extruded and through which they are conducted to a body of cold non-solvent liquid 11 contained in tank 12. The tank 12 is provided with inlet conduit 13, the flow of fluid in which is controlled by valve 14 and also with outlet conduit 15, the flow of fluid through which is controlled by means of valve 16. This system of conduits may be part of a system for rectifying the non-solvent bath and for maintaining the percentage of the non-solvent liquid per se at any desired constant value.

Tank 12 is also provided with a fixed guide 17 over which the filaments pass on their way to a godet roll 18 rotatably mounted inside the tank in such position as to be submerged well below the surface of the liquid 11. Roll 18 may, if desired, be driven by any appropriate means, not shown. Numeral 19 designates a take-off roll in contact, or in close proximity with roll 18, which serves as a guide in conveying the strand of filaments to a second driven godet roll 20 rotatably mounted at the far end of the tank in a manner similar to that of roll 18. Roll 21, which is similar to roll 19, and functions in substantially the same way, serves to guide the strand of filaments from roll 20 and out of the tank into drying chamber 22.

Assuming rolls 18 and 20 are of the same diameter, roll 20 is driven at such a rotational speed as to have a greater linear or surface speed than roll 18, thus causing the yarn to be stretched or drafted in its passage through the bath from one set of rolls to the other. The ratio of the speed of roll 20 to the speed of roll 18 is known as the draft and may, for example, in a given case, be 1.25 or any other figure greater than 1 which may be desired. Likewise the yarn may be drafted between the spinnerette and the first godet roll 18 by operating this roll at a surface speed in excess of the linear speed of extrusion of the solution. In such a case the yarn will be drafted in two stages between the time it emerges from the spinnerette and the time it leaves the solidifying bath. The drafts may be the same or different, as desired. Likewise, the yarn may be drafted solely between the spinnerette and the first godet roll or between the first and second rolls.

It will be understood that the path of the filaments through the body of liquid 11 may be much greater than that illustrated, this being accomplished, either by providing further guides and/or godet rolls so positioned in the tank as to cause the yarn to travel in a circuitous path, or by employing a longer tank, or both. The particular length of path will, of course, vary in accordance with the particular material dealt with, the draft employed, the nature of the product being produced and many other factors.

Tank 12 may be provided with any appropriate means for cooling the body of non-solvent liquid 11, if desired, such as brine coils or other equivalent cooling means which may be submerged in the liquid in the tank or may be so positioned as to surround the tank and thus to provide for proper heat exchange.

Drying chamber 22 may be provided with inlet conduit 23 and outlet conduit 24 for conveying into and through the apparatus a current of heated air as may be required to remove residual solvent from the filaments. The filaments emerge from the chamber 22, pass over guide rolls 25 and 26, thence over stationary guide 27, and finally to a conventional cap spinning device 28.

The operation of the apparatus will be more or less apparent from a consideration of Fig. 1. Briefly, it involves the following steps: A suitable get type cellulose organic acid ester spinning solution, heated to somewhat above its gelation temperature, which of course will differ with each particular cellulose ester and each particular solvent combination, as will be more fully explained below, is introduced into the spinning apparatus by means of conduit 1, passing through valve 2, metering pump 3, candle filter 4 and spinnerette 9. The solution under appropriate pressure emerges from the spinnerette 9 in the form of filaments which pass through the quiet zone in tube 10. Since the atmosphere of this zone is maintained at a temperature within the gelation temperature range of the spinning solution, that is, 10° to 50° C., the filaments immediately solidify by gelation and pass downwardly into the solidifying bath of non-solvent liquid contained in the tank 12.

So far as mere solidification of the filaments is concerned, this could be accomplished merely under the influence of the cold atmosphere of tube 10. However, in the interest of obtaining a practical and desired round cross-section, the filaments are conducted into a cold non-solvent bath. It has been found that if the filaments are immersed in this cold bath (maintained at a temperature of 10°-50° C.), either very shortly after or immediately after extrusion, they will have an almost perfectly round cross section and the residual solvent may subsequently be cured therefrom uniformly and without shrivelling or other distortion of the filament mass. The cold non-solvent treatment is thus found to be especially advantageous in producing said filaments and other attenuated products such as sheets, tubes, rods and the like, as will be more fully explained hereinafter.

The filaments after emerging from the lower end of the tube 10 pass around the guide 17 and then to the first godet roll 18, thence to the second godet roll 20 which, as previously explained, is travelling at a surface speed in excess of that of roll 18 and thereby stretches the filaments as they pass from one end of the bath to the other. During passage of the filaments through the bath which may, for example, consist of toluene, a considerable amount of the solvent contained in the gelled filaments is extracted.

The filaments upon leaving the bath are conducted over roll 21 to drying chamber 22 where they undergo further removal of residual solvent. After the solvent has been more or less completely removed from the filaments they are then wound up in a conventional manner by means of a cap twister or other appropriate winding and twisting device.

Our process will be more readily understood by reference to certain typical examples.

*Example 1*

A solution was prepared by dissolving at 65° C. 23 parts of a cellulose acetate propionate of 29% acetyl and 15% propionyl content in 77 parts of a solvent mixture composed of 65% propylene chloride and 35% iso-propyl alcohol. This solution was maintained at 50–55° C. and was passed at that temperature through the spinnerette of a spinning apparatus, such as that shown in Fig. 1. The resulting filaments were conducted vertically downward through a "dead" air section into a toluene bath maintained at 28° C., through which they were carried for a distance of 6 ft. at a linear speed of 20 meters per minute. The filaments were passed over godet rolls immediately upon entering and just before leaving the toluene. The drafts applied at the first and second godet rolls were 1.18 and 1.39 respectively. After leaving the toluene bath the filaments were passed through a vertical air chamber at 95° C. to remove residual volatile organic solvents.

The resulting filaments were found to have a true circular cross-section and tensile strengths of 1.54 grams/denier dry and 1.44 grams/denier wet, as compared with values of .85 and .71 gram/denier dry and wet, respectively, for filaments of the same composition spun according to standard practice.

*Example 2*

In a manner similar to that employed above a solution of 20 parts of cellulose acetate of 39.3% acetyl in a solvent mixture composed of 66% propylene chloride and 34% iso-propyl alcohol was prepared at 65° C. and delivered at 55° C. to a spinning apparatus, such as shown in Fig. 1. The filaments, after passing vertically downward through the "dead" air section, were passed over a godet roll immersed in a toluene bath maintained at 28° C. through a path six feet in length, then over a second godet roll, and through a curing chamber to a spooling apparatus. The filaments were spun at a linear rate of 28 meters per minute. Drafts of 1.50 and 1.26 respectively were applied at the first and second godet rolls. The filaments which were obtained gave tensile strengths of 2.03 and 1.31 grams/denier dry and wet, respectively, and stretch values of 11.3 and 14.5%.

Further examples of solutions which may be employed as outlined above are the following:

| Example | Acetyl | Higher acyl | Solvent |
|---|---|---|---|
| | Percent | | |
| 3 | 31.3 | 16.7% butyryl | 75% propylene chloride—25% ethylene chloride. |
| 4 | 27.3 | 20.6% butyryl | Propylene chloride. |
| 5 | 29.9 | 14.5% propionyl | 50% propylene chloride—50% ter.-butyl alcohol. |
| 6 | 29.0 | 16.0% propionyl | 50% trichloroethylene—50% ethylene chloride. |
| 7 | 28.0 | 16.0% butyryl | 70% trichloroethylene—30% iso-propyl alcohol. |
| 8 | 28.0 | 17.0% propionyl | 80% trichloroethylene—20% methyl alcohol. |

Preparation of all these solutions must be carried out at temperatures above 50° C. and they should be maintained above the gelling temperature until spun into filaments. Samples of the warm solutions when allowed to cool to room temperature set to non-fluid, self-supporting gels which are resistant to deformation. When spun in the manner described above with a drafting ratio of at least 1.25 applied either during or after immersion in an organic liquid, filaments resulted which were distinctly higher in tensile strength than those obtained by ordinary dry spinning or by spinning with less drafting after immersion in solvents. As previously indicated, the solutions employed for the manufacture of filaments in accordance with our invention are of the type described and claimed in U. S. patents, Nos. 2,319,051, 2,319,052, 2,319,053, 2,319,054 and 2,319,055.

All of these solutions are characterized by the fact that the cellulose derivative material is a cellulose organic acid ester, and preferably a mixed cellulose organic acid ester such as cellulose acetate propionate or cellulose acetate butyrate, dissolved in a liquid which is a solvent for the cellulose ester only at a temperature above about 50° C. and which will give a solution which at a temperature between 10 and 50° C. will form a clear, transparent, self-supporting gel.

As to the non-solvent liquid employed for cooling the cellulose derivative filaments or other attenuated products to or below the gelation temperature and/or further consolidating and solidifying them after formation, any liquid which is a non-solvent for the cellulose ester in question may be employed. However, I prefer to employ non-solvents such as toluene, carbon tetrachloride, xylene, benzene and ligroin. Of these liquids toluene is probably the most satisfactory for all around operation. It may also be said that the non-solvent liquid is preferably selected upon the basis of its power of dissolving or extracting the solvent from the gelled composition, and should itself be sufficiently volatile as to be readily evaporated at 90–100° C., since this facilitates removal of the solvent from the formed product and permits efficient removal of residual solvent in the air curing stage.

It will of course be evident that many variations in the details of our process are possible within the scope of our invention and that no hard and fast rules can be laid down with respect to the specific conditions of operation. It can be said, however, that all of the compositions within the purview of our process are such that they are fluid at temperatures only above about 50° C. and are all susceptible of solidification by gelation at some temperature within the range of 10–50° C. The particular temperatures employed at each stage of the process must be selected upon the basis of the particular gel dope employed. Other conditions of the process such as speed of extrusion, temperature of the extrusion zone (quiet zone), temperature of the cold solidifying bath, draft, and other details, may be similarly adjusted.

It should be pointed out that after the filaments leave the cold solidification bath, they may be subjected to a more or less conventional curing step to remove residual solvent. This may be accomplished by passing the filaments through a current of air heated to an appropriate temperature, such as 80° to 120° C. While the removal of residual solvent is of course necessary in order to produce a satisfactory, saleable product, this step is subsidiary to the main process.

One of the outstanding results obtained by the practice of our invention is the fact that finished filaments and similar extruded products of absolutely circular cross-section may be produced, a result hitherto unobtainable. As is well known in the synthetic yarn industry, it has been considered out of the question to obtain an absolutely circular cross-section filament. This is presumably due to the fact that in the case of cellulose acetate filaments, to take a typical example, as produced according to standard procedure by spinning from an acetone solution, a certain amount of surface evaporation takes place with the result that the outside surface of the filaments tends to skin over. Upon further curing the solvent evaporates from the interior of the filaments, but since the outer layer or surface of plastic material has already solidified, this buckles upon shrinkage of the inner portions of the filament due to evaporation losses. The net result is a bulbous or unevenly rounded cross-section.

While many attempts have been made to obtain a true circular cross-section filament, about the best that has thus far been obtained is the rounded cross-section product just referred to. By the practice of our invention, however, wholly contrary to what would be expected from prior knowledge or experience, we are enabled to obtain a filament of absolutely circular cross-section, presumably because of the unusual characteristics of the cellulose ester spinning solutions we employ which permit them to gel immediately upon extrusion into a cold atmosphere, and upon loss of solvent from the filament body to shrink down uniformly from all points inwardly. In other words, there is no skinning over of the outer surface of the filament and therefore no wrinkling, buckling or other distortion, but a constant uniform reduction in diameter until all solvent has been removed and the filament has been substantially completely cured.

Another outstanding feature of our invention is the fact that filaments produced in accordance therewith are characterized by a tensile strength of approximately twice that of filaments produced from the same cellulose esters by standard evaporative or dry spinning methods employing evaporative type spinning dopes. The ultimate tensile strength of the filaments will of course depend largely upon the amount of stretch or draft which they are permitted to undergo during the spinning operation. Here again our invention has particular advantages in that it permits the filaments to be stretched or drafted while they contain all or substantially all of their solvent content and therefore while they are in a highly plastic condition which facilitates micellar orientation.

*Production of sheets, films and other extruded products*

Broadly considered, the manufacture of sheets, films, tubes, rods and other attenuated products is carried out in basically the same manner as is employed in the manufacture of filaments in that a heated solution of a gel type dope is extruded into a fluid medium maintained at a temperature at or below the gelation temperature of the particular dope employed. If desired, the dope may be extruded simply into an atmosphere refrigerated to a temperature within the gelation temperature range, or it may be flowed directly into a body of cold non-solvent liquid maintained at the desired temperature. These facts will be more apparent from a consideration of a typical process and apparatus which will now be explained.

Referring to Fig. 2 of the drawing, the numeral 30 designates a jacketed type of dope hopper especially designed to handle gel type dopes. 31 is a V-shaped reservoir for the dope which may be supplied thereto by an appropriate conduit (not shown) similar to that illustrated in Fig. 1. The dope is supplied warm, that is, at a temperature above the gelation temperature and at which the dope is fluid.

The hopper may be provided, if desired, with a suitable cover to prevent excessive evaporation of solvents. Heating chambers 32 and 33 are provided in the walls of the hopper, through which any appropriate heat exchange fluid may be circulated, 34 and 35 being inlet conduits and 36 and 37 being outlet conduits to provide for ingress and egress of the heating medium.

Hopper 30 is also provided with a stationary blade 38 and adjustable blade 39, adjustment being by means of thumb screw 40 threaded through lug 41 fixedly secured to one wall of the hopper opposite the fixed blade, as shown. By this means blade 39 may be moved toward or away from blade 38 in such manner as to control the width of the opening between the two blades. An appropriate constant level device may be employed for maintaining the level of the dope at any given point in the hopper, as desired.

In tank 42 is disposed a suitable body of cold non-solvent liquid 43, the liquid being admitted to the tank by means of conduit 44 controlled by valve 45 and removed from the tank by means of conduit 46 controlled by valve 47. The level of liquid in the tank 42 may be maintained constant through adjustment of valves 45 and 47 or by means of a constant level device. Likewise, means for maintaining the bath 43 at the desired temperature may be employed such as brine coils, located inside the tank or surrounding it. Tank 42 is also provided with a guide roll 48 rotatably mounted in the tank directly below the opening between the hopper blades and adjacent to the bottom of the tank. A second guide roll 49 is positioned as shown to facilitate removal of product from the tank.

In carrying out a sheet or film-forming operation in accordance with our invention, the heated dope is supplied to hopper 30. The opening between blades 38 and 39 is adjusted to the desired width by means of thumb screw 40. The dope may flow through this opening by gravity or, if desired, under positive pressure. The blades of the hopper are so positioned as to be submerged to a short depth in the body of cold non-solvent liquid 43. Thus the heated dope emerging from the hopper is flowed or extruded directly into the cold liquid and immediately solidifies by gelation. It will of course be understood that the temperature of the bath 43 is maintained with the gelation temperature range of the dope employed, in any event somewhere between 10° and 50° C.

The dope emerges from between the hopper blades in the form of a sheet which is solidified immediately and then conducted around guide rolls 48 and 49, thence to a suitable air curing apparatus where residual solvents are removed from the film.

It is also within the scope of our invention to employ gellable solutions of the type above referred to, bring them into a gelled condition while containing all or substantially all of their original solvent and then to employ these gelled masses in various extrusion processes such as the manufacture of filaments, ribbons, sheets, tubes, rods and similar objects. Such compositions which are of a jelly-like consistency can readily be forced through the nozzles of almost any type of extrusion device. Likewise, such compositions may also be employed in extrusion molding in which a coating of the cellulose ester material is forced around a core in accordance with standard extrusion molding practice. It may be pointed out, however, that in general it is preferable to employ the extrusion technique above described, rather than directly extruding the gelled compositions in the gelled condition, since shrinkage is excessive and in the case of attenuated products is likely to induce wrinkling or other forms of distortion of the material upon curing.

What we claim is:

The process of producing cellulose organic acid ester filaments of circular cross-section which comprises dissolving at a temperature above 50° C. a cellulose acetate butyrate containing about 31.3% acetyl and about 16.7% butyryl in an amount, greater than the weight of the cellulose ester dissolved, in a solvent composed of about 75% propylene chloride and about 25% ethylene chloride, said solution being capable of forming a clear, transparent, self-supporting homogeneous gel within the temperature range of 10–50° C., extruding the solution from a supply thereof having a temperature above its gelation temperature through a spinneret in the form of filaments, conducting the filaments through a quiescent or dead zone and then through a body of toluene maintained at a temperature of about 28° C., whereby gelation of the filaments occurs, and thereafter removing residual solvent from the filaments.

CHARLES R. FORDYCE.
GERARD J. CLARKE.